E. E. OETTINGER.
ROACH, BUG, AND INSECT TRAP.
APPLICATION FILED APR. 11, 1916.
1,209,993.
Patented Dec. 26, 1916.
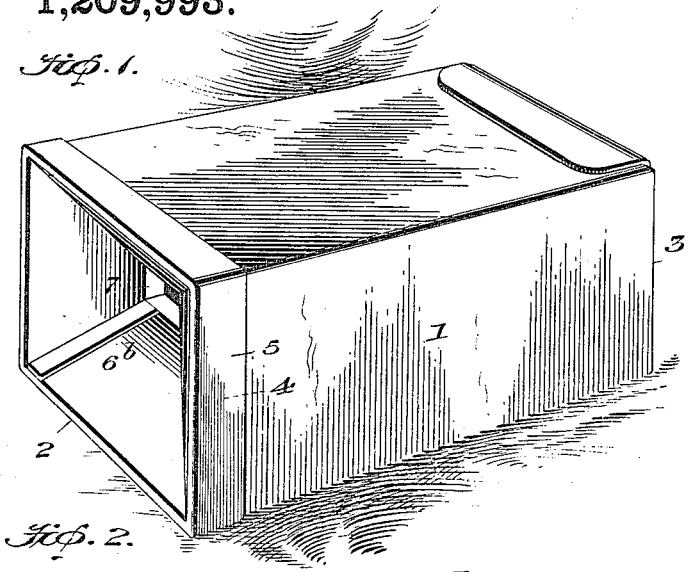
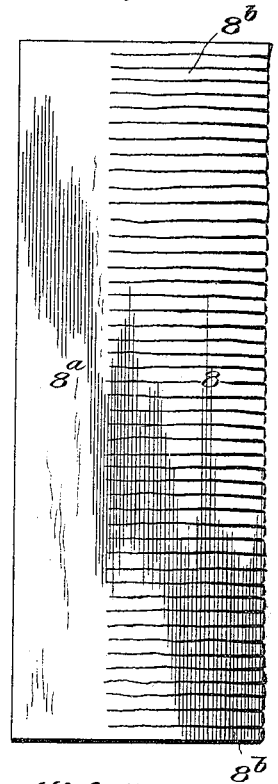
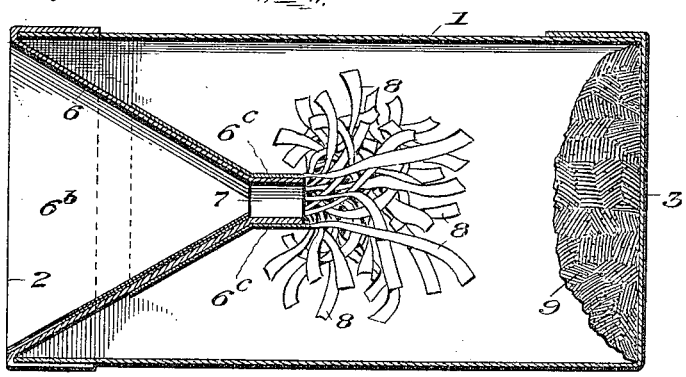
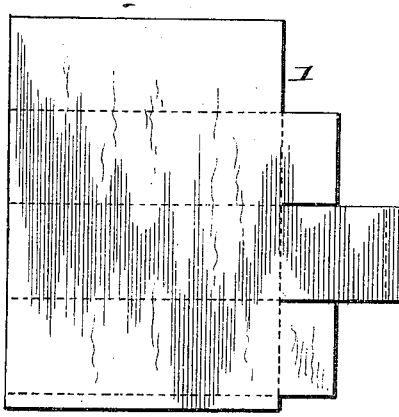
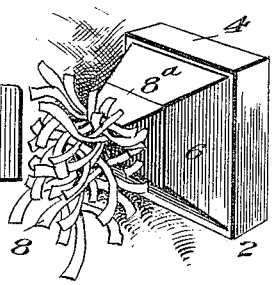
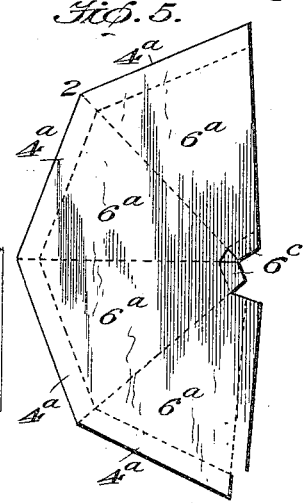
Inventor
Edward E. Oettinger

UNITED STATES PATENT OFFICE.

EDWARD E. OETTINGER, OF CHICAGO, ILLINOIS.

ROACH, BUG, AND INSECT TRAP.

1,209,993. Specification of Letters Patent. Patented Dec. 26, 1916.

Application filed April 11, 1916. Serial No. 90,392.

*To all whom it may concern:*

Be it known that I, EDWARD E. OETTINGER, a citizen of the United States, residing at Chicago, county of Cook and State of Illinois, have invented certain new and useful Improvements in Roach, Bug, and Insect Traps, of which the following is a specification.

This invention relates to roach, bug and insect traps.

Heretofore in roach, bug and insect traps designed to catch insects of different sizes, while the insects are freely admitted regardless of size, difficulty has been experienced in preventing them from coming out of the trap.

My object is to provide an improved roach, bug and insect trap which will facilitate the entry of insects of any size with the least possible friction or obstruction and will be provided with novel means to prevent the exit of the insects, once they are inside the trap.

My invention also contemplates the provision of a roach, bug and insect trap of novel construction which will be simple, inexpensive, easily opened for the discharge of insects which have been caught, and will directly guide the insects to the trap entrance.

My insect trap is of such form that it will hold the bait in an improved manner and will rest securely and firmly on any object on which it may be placed, and when laid on its side, the entrance portion is so constructed that the bugs, roaches or insects can readily crawl into the trap, but, however the trap may be disposed, the entrance portion is constructed in such novel manner that the bugs or insects are guided to the entrance aperture and when once inside the trap, cannot leave it.

The trap may be of any desired material, but is preferably of cardboard of a neutral tint, such as gray, as that color appears to be most attractive, particularly to roaches.

The feature of my invention which prevents the roaches or insects from leaving the trap, once they have passed through the entrance aperture, consists of a plurality of strips, tongues or projecting parts of some light and flexible material, as for instance, tissue paper, which are adapted to close the entrance aperture effectively immediately after the insect has crawled into the aperture and past the flexible strips. These strips being light and more or less delicate, afford no such obstruction as would bar the entry of the insect, as they are readily brushed aside by the roach, bug or insect when entering the trap, and after the insect has entered, these strips fall together and form a complete closure.

I am aware that modifications may be resorted to in carrying out the different features of my invention, and I do not limit myself to the details hereinafter described and shown in the drawings. In making the body or box of wood or glass and, perhaps, of metal, it would not be formed from a blank such as hereinafter described, but as such it will be preferably made of paper or cardboard. While I prefer to use tissue paper strips or fingers, I do not limit myself to them, as threads or other devices might be used as an effective substitute.

The embodiment of the invention which is hereinafter set forth and shown in the accompanying drawings is to be considered as illustrative, rather than restrictive, of the scope thereof.

In the accompanying drawings: Figure 1 is a perspective; Fig. 2, a longitudinal section; Fig. 3, a detail of the tissue ribbon strip before being applied; Fig. 4, a view of the blank for the body; Fig. 5, a similar view of the blank for the cap; Fig. 6, a detail perspective of the cap and barrier; and Fig. 7, a detail of the strip for the cap.

When the trap is made of cardboard, the body 1 may be formed from a blank such as shown in Fig. 4 and the cover or cap 2 from the blank appearing in Fig. 5. The complete body 1 is closed at its rear end 3 and its opposite end is closed by the cap 2 which detachably telescopes thereover by means of the flange 4. The flange 4 is composed of the portions 4ᵃ of the blank, Fig. 5, which are connected together by a strip 5, Fig. 7, pasted thereto. The cap 2 is of pyramidal form, the sides of the pyramid portion 6 being formed by folding of the parts 6ᵃ of the blank, Fig. 5. This pyramidal portion is circumscribed by the flange 4 and, when the cap is on the body, enters the open end of the body 1. The interior of the cap is in the form of a hollow pyramid, as at 6ᵇ, and as the faces thereof lead directly to the edges of the cap which are substantially in line with the sides of the trap body 1, it will be seen that when the trap is lying on its side, as in Figs. 1 and 2, whichever one of the surfaces 6ᵇ is lowermost constitutes a sloping guide up which the insect, bug or roach can readily crawl, and once started on one of these surfaces 6ᵇ, the pyramidal form insures that the insect be directed to the aperture or entrance 7 through the apex of the cap.

Certain ones of the sides 6 are made longer, by preference, than other sides thereof, as at 6ᶜ, to form lips which assist in closing the entrance opening and afford a support for the closure now to be described.

My improved closure which permits the bugs and insects to pass through the entrance opening 7 into the interior of the box or body 1, but prevents them from passing out through said opening, consists of a plurality, preferably numerous, of flexible or free strips or members 8 which are connected to the apex of the cap and project beyond said apex and into the interior of the box or body 1. These flexible strips or members, being light, do not impede the inward progress of the bugs or insects when passing through the aperture 7, but as the strips naturally bunch or fall together, they constitute an impenetrable barrier for the bugs or insects should they attempt to pass out through the entrance opening. Preferably, the guard or barrier composed of the strips or members 8 is made up of pieces of paper, preferably tissue paper, but as other means could be employed for this purpose, I do not limit myself to the use of paper strips. The barrier 8 may be conveniently formed from a single strip of tissue paper 8ᵃ, Fig. 3, which is provided with numerous slits 8ᵇ and the strip is then pasted around the apex of the cap, whereupon the strips of tissue paper come together in a bunch and form a barrier. Being of light material, the insects can readily crawl through, when entering the trap.

The bait 9 may be of any desired material. I find that a Spanish onion, cut in four parts, is well adapted for use as a bait and is particularly attractive to roaches. One of the four parts of the onion will be placed at the rear end of the body 1 and the walls of the latter will prevent the bait from rolling toward the entrance 7. My invention is not limited to any particular bait, nor to the manner in which it is held in the body 1.

The cap 2 is frictionally fitted over the end of the body 1 so that it may be readily removed to discharge the insects which have been trapped.

The uppermost projection or lip 6ᶜ supports the top layer of the strips 8 in a general horizontal position. The upper and lower lips 6ᶜ give the bunch of strips 8 a diffused or spread form and said lips, principally the uppermost one, prevent the top layer of strips from falling down in case they become damp or wet. The support of the strips 8 thus provided prevents an unnecessary weight on the back of the roach or insect which would impede his progress toward the interior of the trap. The upper lip also insures satisfactory closing of the opening 7 by the strips after the insect has passed through the opening but also so supports the strips that easy entrance of a large water bug, for instance, is insured. As soon as such a bug enters the opening 7, it need not move straight ahead, but can enter the trap at the open sides to the right or left of said lips 6ᶜ, or, if the bug is very large, the lip and space arrangement aforesaid permits its body to flatten or spread out and wedging and sticking of the bug is thus prevented.

Having thus described my invention, what I claim as new and desire to secure by Letters Patent, is:

1. A roach or insect trap having an entrance opening and provided with a guard or barrier for said entrance opening comprising a bunch of numerous thin, tissue-like flexible strips or members freely interlaced with each other adapted to permit entry of the roaches or insects into the trap and to automatically close together in bunched and interlaced arrangement to prevent exit therefrom.

2. A roach or insect trap having a body and an entry portion therefor provided with inwardly converging walls having an entrance opening for the admission of roaches or insects into the trap, and a guard or barrier carried by said entry portion and projecting freely and within the body in the region of the entrance opening comprising a bunch of numerous light, flexible tissure strips freely interlaced with each other and contained within the trap and adapted to spread to permit roaches and insects to enter the trap and to close to bar their exit therefrom.

3. A roach or insect trap having an entrance opening and lips thereat which project freely into the interior of the trap, and a guard or barrier for said entrance opening comprising a bunch of numerous thin, light, flexible, tissue strips projecting from said lips and freely interlaced with each other and adapted to permit passage of the roaches or insect into the trap and to close together in interlaced and bunched arrangement to prevent exit therefrom.

In testimony whereof, I hereunto affix my signature.

EDWARD E. OETTINGER.

Copies of this patent may be obtained for five cents each, by addressing the "Commissioner of Patents Washington, D. C."